US012017941B2

(12) United States Patent
Ripley

(10) Patent No.: US 12,017,941 B2
(45) Date of Patent: *Jun. 25, 2024

(54) ENERGY EFFICIENT DECENTRALIZED WASTEWATER REUSE SYSTEM INCORPORATING MULTIPLE STAGES OF AEROBIC BIOREACTORS AND RECIRCULATION FOR ORGANICS AND NITROGEN REDUCTION

(71) Applicant: Dana K Ripley, Pleasanton, CA (US)

(72) Inventor: Dana K Ripley, Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,361

(22) Filed: Apr. 7, 2023

(65) Prior Publication Data

US 2023/0242431 A1   Aug. 3, 2023

Related U.S. Application Data

(63) Continuation of application No. 17/192,234, filed on Mar. 4, 2021, now Pat. No. 11,724,951.
(Continued)

(51) Int. Cl.
*C02F 9/00* (2023.01)
*C02F 1/00* (2023.01)
(Continued)

(52) U.S. Cl.
CPC ............. *C02F 9/00* (2013.01); *C02F 1/001* (2013.01); *C02F 1/32* (2013.01); *C02F 1/441* (2013.01);
(Continued)

(58) Field of Classification Search
CPC .... C02F 9/00; C02F 1/001; C02F 1/32; C02F 1/441; C02F 1/56; C02F 3/04;
(Continued)

(56) References Cited

U.S. PATENT DOCUMENTS 3,623,976 A  *  11/1971  Cessna ................... C02F 3/121
                                                        210/615
4,267,038 A  *   5/1981  Thompson .............. C12N 1/12
                                                        210/903
(Continued)

FOREIGN PATENT DOCUMENTS

CA         2517322 A1  *  1/2007  ................ C02F 3/30
CA         2718851 C   *  4/2012  ................ C02F 3/12
(Continued)

*Primary Examiner* — Ekandra S. Miller-Cruz
(74) *Attorney, Agent, or Firm* — Intellent Patents LLC; Ahmed Alhafidh

(57) ABSTRACT

A decentralized wastewater reuse design utilizing trickling filter (TF)-based aerobic bioreactors responds to the growing need for efficient energy usage per gallon of wastewater treated and/or pound of biological oxygen demand (BOD) removed from processed influent. A facility based on this design is able to adjust power consumption as needed due to external factors, such as utility rate scheduling, grid availability, and/or renewable power sources, without compromising effluent quality performance or increasing energy intensity. The facility improves on past TF applications by overcoming physical hydraulic constraints and expanding the capacity for both aerobic nitrification and anaerobic denitrification throughout the system. This design reduces grid dependency and overall power utilization per gallon of wastewater treated and/or per pound of BOD removal in alignment with climate-oriented policies that are expected to further exert pressure on states and municipalities to shift to carbon-free energy sources supplying all of their water/wastewater facility operations.

5 Claims, 2 Drawing Sheets

Related U.S. Application Data

(60) Provisional application No. 62/987,350, filed on Mar. 9, 2020.

(51) Int. Cl.
  *C02F 1/32* (2023.01)
  *C02F 1/44* (2023.01)
  *C02F 1/56* (2023.01)
  *C02F 3/04* (2023.01)
  *C02F 3/30* (2023.01)

(52) U.S. Cl.
  CPC .................. *C02F 1/56* (2013.01); *C02F 3/04* (2013.01); *C02F 3/305* (2013.01); *C02F 2301/046* (2013.01); *C02F 2303/04* (2013.01)

(58) Field of Classification Search
  CPC ............... C02F 3/305; C02F 2301/046; C02F 2303/04; C02F 1/004; C02F 3/302; C02F 2209/005; Y02W 10/37; Y02W 10/10
  USPC ........................................................ 210/605
  See application file for complete search history.

(56) References Cited

U.S. PATENT DOCUMENTS

| | | | | |
|---|---|---|---|---|
| 4,279,753 | A | * | 7/1981 | Nielson .................. C02F 3/2806 210/615 |
| 5,022,993 | A | * | 6/1991 | Williamson ............ C02F 3/308 210/615 |
| 5,807,484 | A | * | 9/1998 | Couture .................... C02F 3/04 210/906 |
| 6,113,788 | A | * | 9/2000 | Molof ...................... C02F 3/308 210/906 |
| 8,216,472 | B2 | * | 7/2012 | Cord-Ruwisch .......... C02F 3/06 210/252 |
| 2008/0135472 | A1 | * | 6/2008 | Chaffee ..................... C02F 3/04 210/505 |
| 2011/0150707 | A1 | * | 6/2011 | Kobayashi .............. C02F 1/325 422/186.3 |
| 2014/0151294 | A1 | * | 6/2014 | Prior ......................... C02F 9/00 210/151 |
| 2019/0263676 | A1 | * | 8/2019 | Powell ...................... C02F 9/00 |

FOREIGN PATENT DOCUMENTS

| | | | | |
|---|---|---|---|---|
| DE | 3716637 A1 | * | 12/1988 | ................ C02F 3/04 |
| EP | 0575294 B1 | * | 6/1993 | ............. C02F 3/302 |

* cited by examiner

ENERGY EFFICIENT DECENTRALIZED WASTEWATER REUSE SYSTEM INCORPORATING MULTIPLE STAGES OF AEROBIC BIOREACTORS AND RECIRCULATION FOR ORGANICS AND NITROGEN REDUCTION

CLAIM OF PRIORITY

The present application is a continuation application of U.S. Publication No. 20210276908, titled Energy Efficient Decentralized Wastewater Reuse System Incorporating Multiple Stages of Aerobic Bioreactors and Recirculation for Organics and Nitrogen Reduction, filed Mar. 4, 2021, which claims the benefit of U.S. Provisional Patent Application Ser. No. 62/987,350, titled Energy Efficient Decentralized Wastewater Reuse System Incorporating Multiple Stages of Aerobic Bioreactors and Recirculation for Organics and Nitrogen Reduction, filed Mar. 9, 2020, the entire disclosures of which are hereby expressly incorporated by reference herein.

FIELD OF TECHNOLOGY

This disclosure relates generally to wastewater reuse treatment facility design and, more particularly, to an improved trickling filter wastewater treatment design that is energy efficient, compact, and aesthetically appropriate for placement in developed urbanized areas.

BACKGROUND

Early wastewater systems involved installing collection pipelines discharging at the lowest elevation of the service area adjacent to a river or the ocean. These gravity collection systems were built chiefly for conveyance and disposal, which involved discharging effluent into the environment without thought of pollution control. Later, secondary treatment systems were introduced at the point of discharge to remove biochemical oxygen demand (BOD) and suspended solids (SS) prior to release to the environment. As social and economic concerns surrounding water scarcity continue to arise, especially in the Western United States and other arid regions worldwide, there is a focus on water reuse of effluents currently being discharged to the environment. The issue that arises is effluent available for reuse is located generally at one location at the lowest elevation of the community, and potential reuse sites (e.g., irrigation, commercial, industrial, toilet flushing, etc.) are located throughout the community. This has created a need for decentralized water treatment systems which are positioned and designed to satisfy non-potable water demands distant from large centralized wastewater treatment plants.

The primary constraints to decentralizing wastewater treatment are aesthetics and cost. U.S. Pat. No. 4,279,753 ('753) describes a wastewater treatment system involving a secondary treatment system which incorporates a series of alternating aerobic and anaerobic bioreactors. This design was meant to address the treatment and aesthetic issues—the system was compact, enclosed and architecturally concealed, and was odor free within a few feet around the system. It was designed to meet reuse standards for BOD, SS, and nitrogen reduction, and performed well enough when flows were relatively low compared to rated capacity. However, at higher flows, the alternating aerobic/anaerobic bioreactors experienced recurring physical hydraulic constraints unrelated to the theoretical biological processes described in '753. The internal process flow of '753 is dependent on only a few inches of gravitational head in submerged pipelines between successive bioreactor stages, causing severe flow bottlenecks between bioreactors when the influent flow rate nears rated capacity.

Membrane bioreactors (MBRs) have overtaken the decentralized water treatment market and operate using a combination of membrane and activated sludge processes. MBRs are typically rated to process at least 50,000 gallons per day (gpd) and are widely used for municipal, commercial and industrial wastewater treatment. However, MBRs are prone to consuming excessive power and, at maximum operational hydraulic capacity, may struggle to satisfy growing BOD and nitrogen reduction demands. Although MBR-based treatment facilities may be compact, reliable, and a proven treatment technology, they are costly to operate and maintain. Beyond the high-power demand, membrane cassettes need to be routinely removed from service for periodic cleaning, and cassettes need to be replaced in two to five-year intervals. Cassette cleaning (requiring citric acid, high strength chlorine or other caustic solutions such as sodium hydroxide) and periodic cassette replacement present additional operating costs unique to MBR technology.

The rise of MBRs in the industry may be due in part to the fact that the efficiency of wastewater treatment facilities power utilization (i.e. energy intensity) has been traditionally measured based on kilo-watt hours per gallon (kWh/gal) of water treated instead of kilo-watt hours per pound (kWh/pound) of BOD removed from the influent. Environmental and regulatory forces have in large part focused on promoting the reduction of water usage. However, from a wastewater treatment standpoint, this means increased concentration of organic matter in the influent and thus a greater need for BOD, SS and nitrogen removal per unit volume of effluent produced. The use of the kWh/gal metric has resulted in repeated underestimation of MBR energy intensity, particularly in arid climates where the water conservation ethic has firmly taken hold.

Trickling filtration is a secondary treatment method known to consume substantially less electricity than activated sludge processing plants, including MBRs (*Electricity Use and Management in the Municipal Water Supply and Wastewater Industries*, November 13 Report, by the Water Research Foundation and the Electric Power Research Institute, page 5-7, table 5-2). This WEF/EPRI report indicates an energy intensity of 630 kWh/mg for trickling filters relative to 2,700 kWh/mg for MBRs. From a BOD reduction standpoint, trickling filters are also known to have a significantly lower energy demand per pound of BOD removed relative to other contemporary activated sludge methods (see *Electric Use at Pennsylvania Sewage Treatment Plants*, March 2011 Report, Pennsylvania Department of Environmental Protection, page 8, FIG. 5). Furthermore, it has been observed that when recycling nitrified effluent back to existing upstream carbonaceous filters, there is a considerable denitrification facility intrinsic to the deeper layers of anaerobic biofilm that form throughout the surfaces of the trickling filter (see Biesterfeld et. al. 2002, Heukelkian 1943).

The primary use of electricity in wastewater treatment is providing dissolved oxygen (DO) to the influent waste stream for BOD and nitrogen reduction in the bioreactors. Many wastewater treatment plant owners pay for electricity on a time-of-use (TOU) basis when $/kWh costs are substantially higher during peak hours of the day, typically 4 pm to 9 pm during the summer months. TOU rate schedules are based on season with summer rates higher than winter rates.

Any activated sludge plant (especially MBR's) cannot tolerate a shutdown of its aeration system for even a few seconds since the aerobic suspended growth bioreactors will likely become septic (i.e. void of oxygen) within minutes. Attached growth trickling filter bioreactors, on the other hand, can tolerate shutdown of recirculation pumps for hours, or even days, without difficulty restarting since the aerobic attached growth bioreactors contain plentiful oxygen with ambient air at atmospheric pressure. This is a distinct advantage of trickling filter systems particularly as more electric utilities adopt TOU rate structures and become more susceptible to weather/climate related shutdowns.

Beyond typical TOU rate schedules, some electric utilities have adopted real-time-pricing (RTP) where rates based on daily weather conditions and hour-of-day determine $/kWh costs. The RTP concept is in response to utilities' transition to renewable power sources, such as wind and solar, which is variable due to daylight and weather conditions. The large California investor-owned utilities expect their renewable portfolios to contribute 61% of their total power demands by the year 2023 (CPUC, Renewables Portfolio Report, page 11, Table 2). One RTP utility schedule in Southern California, for instance, lists a cost of $3.78755/kWh at 6 pm on a hot summer weekday compared to a cost of $0.01748/kWh at 11 am on a mild summer weekend day. In return for reducing power demand during critical hours, electricity customers receive lower rates throughout the remainder of the year. The ability of a trickling filter water recycling facility to power down during critical peak cost hours could substantially reduce total annual power costs where electric utilities have adopted RTP. By Executive Order of President Biden, it is now federal policy to combat the global climate crisis by encouraging power efficiency and accelerating electric power generation transition to carbon-free renewable sources. There is a need for decentralized water recycling facilities that reliably produced compliant tertiary effluent while at the same time minimize energy intensity consistent with federal policy.

Recent discovery of a new virulent strain of coronavirus (COVID-19) has created concern for wastewater plant operators working upstream of disinfection. Coronavirus RNA fragments are known to pass through the human gut in fecal matter and persist in wastewater, but are easily killed with common disinfection (ultraviolet light, chlorine, peracetic acid, etc.). Especially around collection systems and activated sludge basins where undisinfected wastewater is aerated, operators can be exposed to aerosols and water droplets above and near these tanks. This issue holds for MBRs as well which have fine bubble diffusers in aeration tanks and coarse bubble diffusers for membrane scouring in the MBR cassette tanks. Wind-blown aerosols can also travel to areas immediately surrounding any treatment facility that does not include process air containment.

Therefore, there exists a need for a decentralized wastewater treatment system design that maximizes BOD, SS and nitrogen reduction while minimizing power consumption, can routinely reduce power demands during peak TOU and RTP peak hours, can tolerate anticipated and unanticipated power grid shutdowns, hybridizes aerobic/anaerobic denitrification, optimizes layout and configuration to eliminate internal hydraulic constraints during peak facility operation, and provides a more economical and environmentally responsible alternative to popular activated sludge designs such as MBRs. In addition, this need for decentralized systems located in urban areas must be compact, quiet, aesthetically pleasing, and include air containment/odor control while minimizing cost and environmental impacts. It is also important that any system minimize plant operator and surrounding area exposure to wastewater-borne bacterial and viral pathogens such as COVID-19.

SUMMARY

Various wastewater treatment facility system designs and methods are provided which overcomes the hydraulic constraints of current trickling filter technology while maintaining performance and improving energy efficiency.

In one aspect, a method of wastewater treatment involves distributing a flow of influent to one or more flow equalization basins. The flow is further distributed to an anoxic mixing basin in which the influent is anaerobically denitrified. The influent then flows to one or more primary clarifiers which are physically adapted to collect solids and/or collect sludge from the influent. An overflow of fluent from the primary clarifier(s) is collected in trickling filter pump basins which have one or more partitions. The influent in the trickling filter pump basins is distributed through one or more trickling filter towers positioned relatively above grade. The trickling filter towers comprise a media allowing a biofilm to remain therein at a thickness that fosters BOD reduction, aerobic nitrification, and anaerobic denitrification conditions. The influent is then distributed from the trickling filter pump basins to one or more final clarifiers which collect solids and/or sludge from the influent. The influent is then filtered through one or more continuous upflow recirculating sand filters through which the influent is further denitrified.

Another aspect of the wastewater treatment method may involve distributing the flow of suspended solids recycled and sludge collected from the primary clarifier(s), a sludge storage, the trickling filter pump basin(s), the final clarifier(s), and the continuous upflow recirculating sand filter(s) to the flow equalization basin(s).

Yet another aspect of the wastewater treatment method involves positioning of the one or more trickling filter tower is vertically oriented higher compared to the other components in order to eliminate gravity head loss in the trickling filter towers. Furthermore, filtering the influent in the one or more continuous upflow recirculating sand filters may involve supplementing the influent with a coagulant polymer and/or a carbon source. The effluent from the continuous upflow recirculating sand filter may be further sterilized through a redundant parallel in-line UV light system or filtered further in a reverse osmosis process.

The wastewater treatment method may involve a power saving aspect which accelerates influent process in the primary clarifier(s) and the final clarifier(s) when outside of a shutdown period. During the shutdown period, all equipment may be powered off except one or more of the group consisting of: a flow equalization basin mixer, an anoxic mixing basin mixer, one or more pumps of the trickling filter pump basins, and a trickling filter ventilation blower. Furthermore, during the shutdown period, the wastewater treatment method may involve recirculating influent from a final trickling filter tower of the one or more trickling filter towers to the flow equalization basin(s).

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Water treatment facility designs will be shown and described. The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
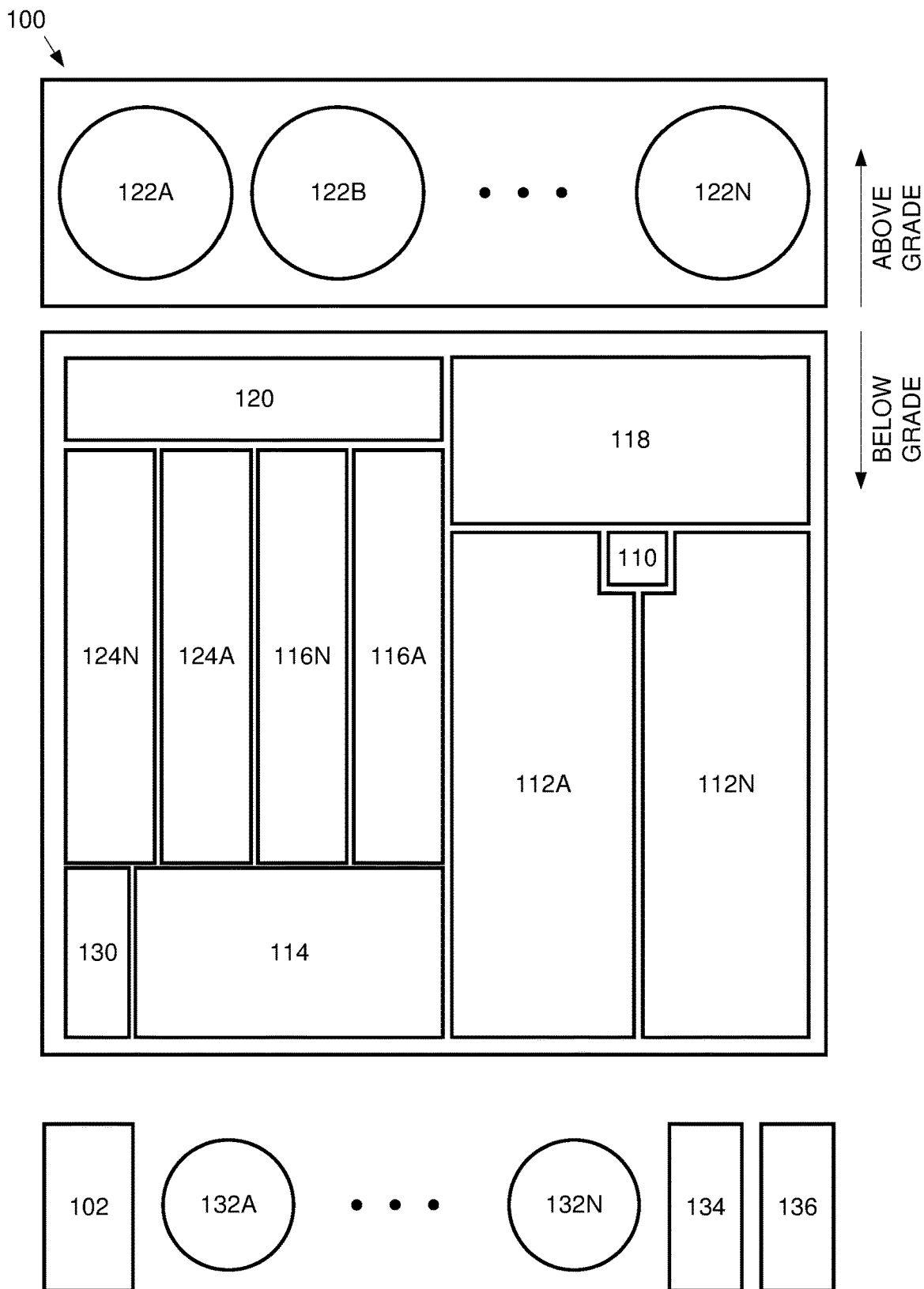
FIG. 1 is a layout plan of an exemplary wastewater treatment plant, according to one or more embodiments.
Figure 2:
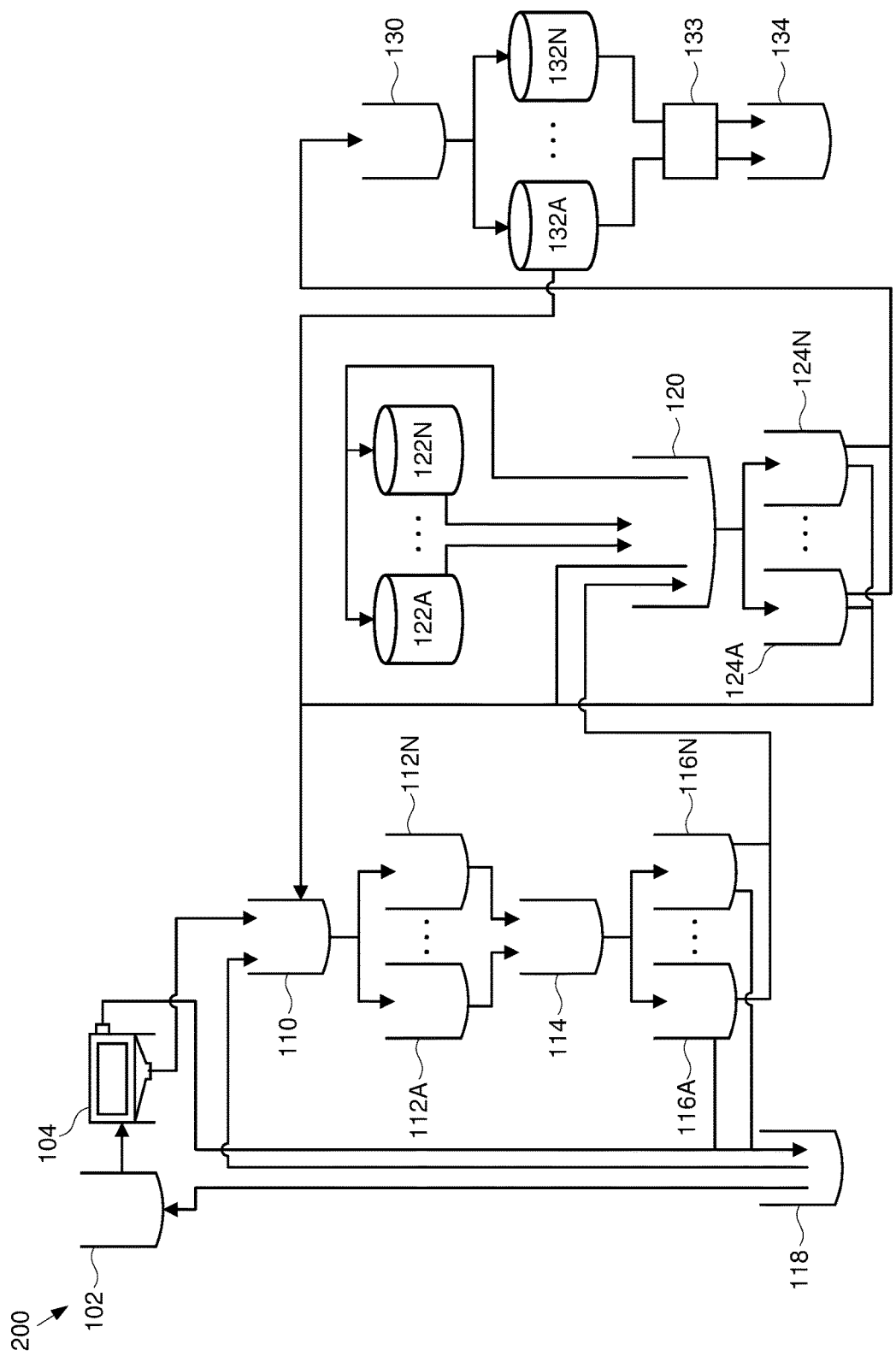
FIG. 2 is a process schematic diagram showing an exemplary wastewater treatment method, according to one or more embodiments.

Aspects of this disclosure involve addressing nitrogen reduction demands in water treatment facilities by employing various methods and design techniques. Referring to FIG. 1, an exemplary wastewater treatment plant layout 100 is illustrated, according to one or more embodiments. Additionally, an exemplary process schematic diagram 200 of a wastewater treatment method is illustrated in FIG. 2. Any of the components of the wastewater treatment plant as shown may be cycled by a programmable logic controller 136 (PLC) coupled thereto.

Influent is received from an influent pump station 102 which feeds it one or more screening methods 104 utilizing at least one pump. An internal feed rotary screen, for example, may be used to collect solids. Screened influent may then flow from the one or more screening methods 104 to a flow equalization basin (FEB) splitter basin 110 which splits the screened influent into one or more FEB s 112A-N. The FEB s 112A-N serve as influent storage and are aerated by at least one blower, such as a positive displacement blower. The FEB splitter basin 110 also receives SS from other components and equalizes the SS received by each FEB 112A-N. Additionally, the influent in the FEB(s) 112A-N is mixed by at least one mixer, such as a submersible propeller mixer. FEBs 112A-N absorb the impact of daily influent surges and prevent solids and organic material from being flushed rapidly through or out of the system. Flow continues from the FEB s 112A-N to an anoxic mixing basin 114 in which anaerobic denitrification can be concentrated and fueled by readily available carbon or electron sources, usually in the form of alcohols, acetates, sugars typically available in the wastewater or supplemented. The anoxic mixing basin 114 also comprises a submersible propeller mixer.

After the anoxic mixing basin 114, flow continues to one or more primary clarifiers 116A-N which collects primary solids. The primary clarifiers 116A-N may utilize a sludge collection method, such as a mechanical scraper to collect primary solids, and an airlift pump to discharge collected solids to aerated sludge storage 118.

Aerated sludge accumulated in the aerated sludge storage may be dewatered through one or more methods, such as a solids thickener, producing a liquid fraction and a solids discharge. The liquid fraction may be recycled back to the influent pump station 102 and/or the FEB splitter 110 and discharged solids may be further processed by a rotary fan press using an appropriate polymer feed. Similarly, the produced liquid fraction may be recycled back to the influent pump station 102 and/or the FEB splitter 110. Dewatered solids may be removed periodically and processed either on-site or off-site. Decanted SS from the aerated sludge storage 118 may be returned to the FEB splitter 110.

Wastewater overflows from the primary clarifiers 116A-N and to two or more trickling filter (TF) pump basin(s) 120. An alkalinity feed (e.g., $CaCO_3$) may be incorporated prior to distribution to the TF pump basin(s) 120 for pH control. The TF pump basin(s) 120 may comprise one or partitions and utilizes recirculation pumps to distribute wastewater overhead at the top of one or more TF tower(s) 122A-N. The partitions of the TF pump basin(s) serve to prevent short-circuiting or unintended bypass of sequential tower stages. The TF towers(s) 122A-N may be positioned above grade in general compared to the rest of the wastewater treatment facility. The TF towers may be situated above the clarifier tanks or at grade adjacent to the TF pump basins. More importantly, there are no interstage clarifiers which punctuate the flow between successive TF towers. This serves to eliminate gravity head loss through the multi-stage TF bio-towers.

The TF tower(s) 122A-N may substantially comprise a media (e.g., rigid plastic) having a high surface area which can preserve the aerobic conditions during a temporary shutdown and allow biofilm thereon to remain at a thickness that fosters underlying anaerobic denitrification conditions (i.e., at least 100 μm, see Biesterfeld et al.). Additionally, the TF tower(s) 122A-N may comprise low pressure ventilating blowers which provide further DO with minimal energy required. In one embodiment, any of the TF towers 122A-N may be cycled on or off without affecting the aerobic conditions therein. Even though biofilm may partially slough off after returning from shutdown, the treatment plant may be programmed to recycle resulting SS to be recycled back to the FEB splitter basin 110 (e.g., for a 10-minute period) to supplement the biomass in the anoxic mixing basin 114 for enhanced denitrification.

The aerobic and anaerobic denitrification potential of the TF tower(s) largely depends on the stratification of biofilm thickness therein. Specifically, reductive denitrification occurs within upper thick biofilms and oxidative nitrification occurs within lower thin biofilms.

The TF pump basin(s) 120 flow out to final clarifiers 124A-N which at least partially recycle secondary effluent back to the FEB splitter 110, furthering denitrification in the anoxic mixing basin 114. The final clarifiers 124A-N may comprise plastic media, such as tube settlers, which are submerged and maximize settling areas for particles. This plastic media provides a further substrate for anaerobic bacteria growth and fosters an additional environment conducive to denitrification. Since the plastic media maximizes solids capture, it creates an additional barrier (to gravity settling) for solids breakthrough resulting from excessive TF sloughing that may occur occasionally. The final clarifiers 124A-N may collect biosolids using a multi-port suction manifold or a mechanical scraper and transfer the same to the FEB splitter basin 110 through an airlift pump.

Secondary effluent from the final clarifiers 124A-N overflows to a secondary effluent pump station 130 which pumps the secondary effluent to tertiary filters. One or more continuous upflow recirculating sand filters (RSFs) 132A-N. RSFs have a demonstrated ability to remove total nitrogen to very low levels (e.g. total nitrogen levels <10 mg/L) in addition to removing phosphorous. Additionally, a coagulant polymer may be added to promote flocculation and a carbon source such as methanol may be added to provide an adequate food source for additional denitrification. Backwashed solids captured by the RSF(s) 132A-N may be recycled back to the FEB splitter 110. Otherwise, effluent from the RSFs 132A-N may continue to an effluent pump station 134. A redundant parallel in-line UV light system 133 may be utilized before the effluent is pumped. A further reverse osmosis (RO) sidestream may also be utilized to remove salts and nitrates in the effluent and reduce total dissolved solids (TDS) further.

With respect to environmental impact, the described embodiments are a clearly superior alternative to contemporary wastewater treatment in particular popular MBR activated sludge systems. Legislation like the California Environmental Quality Act (CEQA) and the California Global Warming Solutions Act mandate that wastewater plant owners subject to environmental review demonstrate that a considered project minimizes environmental impact. Since power consumption is directly related to environmental impact, MBR technology could be effectively banned in California. Based on published references noted above from highly reputable U.S. industry research and government sources, the energy intensity of TF's is typically less than one third of the energy intensity of MBR's.

With respect to cost, the described embodiments are a clearly superior alternative to contemporary wastewater treatment in particular popular MBR activated sludge systems. The ability to reduce power consumption during peak TOU or RTP hours is clearly an advantage since power costs may represent the highest category of ongoing treatment facility operating costs. For instance, the San Diego Gas and Electric (SDG&E) Feb. 1, 2020 rates for small commercial customers include an on-peak summer rate of $0.39242/kWh relative to an off-peak rate of $0.16930/kWh (Schedule TOU-A2). This represents a cost premium of 232% for power consumed during summer peak TOU hours relative to off-peak TOU hours. According to Southern California Edison's (CSE) 2020 RTP Schedule, an example low-cost rate during the weekend at 11 am may be $0.01748/kWh whereas a high-cost rate at 6 pm on a summer weekday can run as high as $3.78755/kWh. The low power mode of the attached growth multi-stage trickling filter system described herein offers significant savings by its ability to substantially reduce power consumption during peak TOU or RTP hours on a routine daily basis. The described design allows for adjusting facility operation around shifting rate schedules and therefore climate-oriented impacts.

Recent California wildfires have created unique constraints on the availability of power in the last year, with Pacific Gas and Electric (PG&E) scheduling power outages along 18,500 miles of overhead high voltage transmission lines in areas sensitive to grid-induced fires. For many, these outages were largely unforeseen, even when given short notice. To account for the increased cost of management and repair, California power companies have already drastically increased electricity costs or changed rate policies to incentivize different usage behavior. PG&E, SDG&E, and Southern California Edison (SCE) have initiated TOU and RTP rate structures in which customers pay an additional cost for electricity during peak hours, typically 4 pm to 9 pm during the summer months. More specifically, electricity costs for businesses are split into a fixed customer charge, an energy use charge, and demand charges. Energy use charges are based on the power actually consumed in kWh during the corresponding billing period. Demand charges are calculated based on business' highest recorded demands in kW during corresponding billing period. Demand charges include time-related demand charges which apply during the summer seasons and facilities-related demand charges which apply year-round. Both energy and demand rates are highest during the summer months. Additionally, electricity companies offer the ability to cycle on-site equipment (i.e., solar panels, battery storage or generator) in exchange for credits on future summer billings. These shifts in policy have been motivated not only by recent strains on the power grid but also by the need to align electricity usage with access to renewable sources.

During summer months, irrigation demands and electricity energy/demand costs are highest. The attached-growth trickling filter process requires a fraction of the electricity required relative to suspended growth activated sludge plants (including MBRs). The use of TF bio-towers directly lowers energy ($/kWh) and demand charges ($/kW) by at least two thirds relative to MBR's but additional considerations must be made to account for power outages during peak season. The treatment facility must be able to produce the rated daily capacity during peak irrigation season, even if the plant is routinely operating in a low power mode to reduce electrical demand during peak TOU or RTP periods.

In one embodiment, the treatment plant may be programmed to operate in a low power mode in which all TF tower recirculation pumps and FEB blower aeration may be turned off. During the low power mode, one FEB mixer, one anoxic mixing basin mixer, and/or one TF tower ventilation blower may remain on or alternate between on and off. Additionally, recirculation from the final TF tower 122N to the FEB splitter basin may remain at a reduced flow rate using a minimal power consuming air-lift pump. Additionally, a pump in the TF pump basin may remain minimally operational to ensure the biomass in the TF towers remains moist and prevent sloughing off once operations resume at full power; moisture, not oxygen is essential to keeping the biomass intact in low power mode. During this shutdown period, the treatment plant still provides passive denitrification while also serving as influent storage. To enable a shutdown period, the treatment plant may operate at an accelerated rate when full operation resumes utilizing stored influent from an increased capacity flow equalization basin.

Power cycling during low power mode may be automated by programming a PLC according to a schedule which minimizes electricity costs during peak TOU or RTP hours. For example, the PLC 136 may be set to enable low power mode weekdays from 5 μm to 9 pm. During the low power mode, backup power sources such as on-site solar panels, generators, and/or battery storage may be used during this peak period while low power mode is utilized. During this time, any extra power generated by the backup power sources may be returned back to the grid or to provide localized backup for nearby housing or industrial facilities. This concept is generally referred to as a "micro-grid" which advances the notion of power independence from regional transmission and distribution grids.

Upon reaching the end of the peak TOU or RTP period (e.g., summer weekdays at 9 pm), the treatment plant may be programmed to operate in a recovery mode during which the treatment plant compensates for lost time during the low power mode period (e.g., 4 hours). Additionally, particular physical design parameters must be considered in order to account for wastewater retention during peak irrigation hours. During the recovery mode, excess wastewater retained in the FEBs 112A-N while the TF tower(s) 122A-N recirculation pumps were disabled must be discharged rapidly. As such, the FEB s 112A-N must be sufficiently large to retain influent flows during the peak TOU or RTP shutdown hours.

The wastewater treatment design as laid out in '753 is unable to handle flows near rated capacity, let alone during peak summer season when wastewater effluent demand is the greatest. The present treatment plant would not have the same hydraulic limitations and, outside of low power mode, operates at about 125% of rated capacity (in gallons per minute) to account for lost hours during the peak TOU or RTP shutdown period.

To facilitate power efficiency during "shoulder" seasons and off-seasons, the trickling filter treatment plant can adjust power requirements by operating at reduced or zero flow rates. During the winter season, there may be no demand for effluent and the treatment system should power down completely. MBRs, on the other hand, require a minimum 50% power demand (relative to full capacity operation) in order to retain the biology necessary for aerobic respiration, anaerobic denitrification and keep submerged membranes scoured. Absent compressed air for continuous membrane scour, the membrane pores could foul irreparably.

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for claims and as a representative basis for teaching one skilled in the art to variously employ the embodiments.

The embodiments described herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination into a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A wastewater treatment system, comprising:
   one or more flow equalization basins configured to receive a flow of influent;
   an anoxic mixing basin configured to anaerobically denitrify the influent received from the one or more flow equalization basins;
   one or more primary clarifiers applying a first solids collection method to the influent received from the anoxic mixing basin;
   a trickling filter pump basin which collects an overflow of the influent from the one or more primary clarifiers, wherein the trickling filter pump basin comprises a plurality of partitions;
   one or more trickling filter towers positioned above grade and comprising a media having a biofilm remain thereon at a thickness that fosters BOD reduction, aerobic nitrification, and anaerobic denitrification conditions,
      wherein the influent in the trickling filter pump basin is distributed through the one or more trickling filter towers and returns to the trickling filter pump basin;
   one or more final clarifiers through which the influent from the trickling filter pump basin is distributed, wherein the one or more final clarifiers comprise a second solids collection method; and
   one or more continuous upflow recirculating sand filters configured to further denitrify the influent from the one or more final clarifiers.

2. The system of claim 1, wherein distributing flow of the influent to the one or more flow equalization basins also involves distributing to the one or more flow equalization basins a flow of suspended solids recycled and sludge collected from one or more of the group consisting of: the one or more primary clarifiers, a sludge storage, the trickling filter pump basin, the one or more final clarifiers, and the one or more continuous upflow recirculating sand filters.

3. The system of claim 1, wherein a positioning of the one or more trickling filter towers is vertically oriented higher compared to the one or more primary clarifiers, the trickling filter pump basin, and the one or more final clarifiers in order to eliminate gravity head loss in the one or more trickling filter towers.

4. The system of claim 1, wherein during a power saving period, the wastewater treatment system provides passive denitrification and maintains a moisture content of the biofilm in the one or more trickling filter towers by keeping one or more equipment selected from the group consisting of: a flow equalization basin mixer, an anoxic mixing basin mixer, one or more pumps of the trickling filter pump basin, and a trickling filter ventilation blower.

5. The system of claim 4, wherein during the power-saving period, the influent from the one or more trickling filter towers is recirculated to the one or more flow equalization basins.

* * * * *